Figure 1:
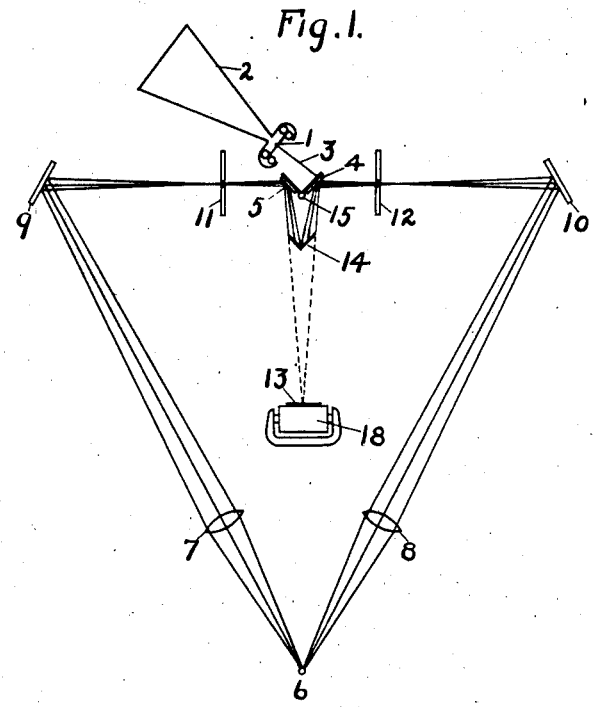

F. W. ADSIT.
PHOTOGRAPHIC PHONOGRAPH.
APPLICATION FILED FEB. 25, 1918.

1,338,719.

Patented May 4, 1920.

Inventor
Frank W. Adsit
by C. D. Enochs
Attorney

UNITED STATES PATENT OFFICE.

FRANK W. ADSIT, OF ST. PAUL, MINNESOTA.

PHOTOGRAPHIC PHONOGRAPH.

1,338,719.  Specification of Letters Patent.  Patented May 4, 1920.

Original application filed December 4, 1916, Serial No. 135,265. Divided and this application filed February 25, 1918. Serial No. 219,150.

*To all whom it may concern:*

Be it known that I, FRANK W. ADSIT, a citizen of the United States, and a resident of St. Paul, in the county of Ramsey and State of Minnesota, have invented certain new and useful Improvements in Photographic Phonographs, of which the following is a specification.

This application is a division of my co-pending application Serial No. 135,265, filed Dec. 4, 1916, entitled "Photographic phonographs".

One object of my invention is to provide means for registering on a film graphic representations of sound waves.

Another object of my invention is to provide means for registering on a film graphic representations of sound waves in such a manner as to have the graphic representations clearly defined and of as great amplitude as possible.

Another object of my invention is to provide means in connection with a sensitized film such that light reflected from a mirror may be registered on a film on one side of the center line thereof when the reflecting mirror moves in one direction from its normal position, and on the other side of its center line of the film when the mirror moves to the other side of its normal position.

With these and incidental objects in view, the invention consists of certain novel features of construction and combination of parts, the essential elements of which are hereinafter described with reference to the drawing which accompanies and forms a part of this specification.

Figure 2:
Figure 3:
Figure 4:
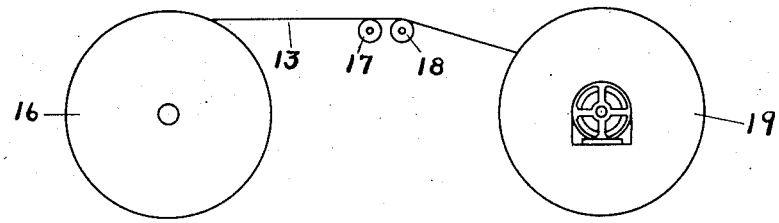

In the drawing Figure 1 is a schematic view of my recording means. Fig. 2 is a negative film produced by my recording means. Fig. 3 is a positive film produced from the negative shown in Fig. 2, and Fig. 4 is a schematic representation of my film winding means.

The diaphragm 1, Fig. 1, mounted in the horn 2, of ordinary construction, carries a link 3 to which is hinged a double angle mirror having faces 4 and 5.

A source of light 6 projects light rays therefrom, which passes through the lenses 7 and 8 and are projected by the mirrors 9 and 10, respectively, through stops 11 and 12 onto the mirror faces 5 and 4, respectively.

The light rays from the mirrors 4 and 5 are normally cut off from the film 13 by the stop 14, but it is apparent that if the diaphragm 1 is moved downwardly, the mirrors 4 and 5 will be turned angularly about their common support 15 and a certain amount of light will be projected from the mirror 5 onto the film 13, but no light from the mirror 4 will reach the film 13; also if the diaphragm is moved upwardly part of the light of the mirror 4 will fall on the film 13, while none of the light from the mirror 5 will reach the film, in each case the light from the non-active mirror being shut off by the stop 14.

It is evident therefore that if the diaphragm 1 vibrates, as under the influence of a voice or musical tone, a certain amount of light will be projected on the film 13, and the position and amount of light received on the film will depend upon the position occupied by the diaphragm 1 at any particular instant, the result being a film similar to that shown in Fig. 2, and a positive from that negative would be similar to that shown in Fig. 3.

The film would preferably wind from a spool 16, Fig. 4, by any suitable rollers 17 and 18, onto a spool 19, run at suitable speed.

It is evident that with a positive similar to the one shown in Fig. 3, passed through a suitable reproducing means, the original sound wave could be produced, but as this is part of my copending application, the reproducing means will not be described or illustrated herein, as this application claims only the film and means for producing the same.

While I have described my invention and illustrated it in one particular design, I do not wish it understood that I limit myself to this construction, as it is evident that the application of the invention may be varied in many ways within the scope of the following claims.

Claims:

1. In a photographic phonograph the combination of a sensitized film, a source of light, means controlled by sound vibrations whereby light may be thrown on one side or the other side of the center line of said film, and stationary means for preventing light being thrown on both sides of said center line at the same instant, 2. In a photographic phonograph the combination of a sensitized film, a source of light, means controlled by sound vibrations whereby light may be thrown on one side or the other side of the center line of said film, producing thereon a record; and stationary means comprising a stop for preventing light being thrown on both sides of said center line at the same instant.

3. In a photographic phonograph the combination of a sensitized film, a source of light, means for projecting the light rays from said source of light onto said film, said means including a double mirror hinged and controllable by sound vibrations, a stop for preventing light from one half of said double mirror from being thrown on beyond the center line of said film.

FRANK W. ADSIT.